(12) United States Patent
Takahashi

(10) Patent No.: US 12,220,630 B2
(45) Date of Patent: Feb. 11, 2025

(54) GAME SYSTEM FACILITATING MULTIPLE PLAYERS PLAYING TOGETHER WITH DIFFERENT GAME OPTIONS

(71) Applicant: BANDAI NAMCO ENTERTAINMENT INC., Tokyo (JP)

(72) Inventor: Toru Takahashi, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 254 days.

(21) Appl. No.: 17/795,406

(22) PCT Filed: Dec. 21, 2020

(86) PCT No.: PCT/JP2020/047691
§ 371 (c)(1),
(2) Date: Jul. 26, 2022

(87) PCT Pub. No.: WO2021/166416
PCT Pub. Date: Aug. 26, 2021

(65) Prior Publication Data
US 2023/0094057 A1    Mar. 30, 2023

(30) Foreign Application Priority Data
Feb. 21, 2020  (JP) ................. 2020-027752

(51) Int. Cl.
*A63F 13/35*  (2014.01)
*A63F 13/46*  (2014.01)
(Continued)

(52) U.S. Cl.
CPC ............ *A63F 13/46* (2014.09); *A63F 13/847* (2014.09); *A63F 2300/61* (2013.01)

(58) Field of Classification Search
None
See application file for complete search history.

(56) References Cited

U.S. PATENT DOCUMENTS 9,649,568 B2 *   5/2017  Wada ................. A63F 13/46
10,456,686 B2 * 10/2019  Patton ................ A63F 13/79
(Continued)

FOREIGN PATENT DOCUMENTS

JP    2002-239237 A    8/2002
JP    2016-192987 A   11/2016
(Continued)

OTHER PUBLICATIONS

Feb. 2, 2021 Search Report issued in International Patent Application No. PCT/JP2020/047691.

*Primary Examiner* — Lawrence S Galka
(74) *Attorney, Agent, or Firm* — Oliff PLC

(57) ABSTRACT

A game system and others enable a player to appropriately win a mission achievement reward etc. The game system includes: a group organizing unit which associates two or more players constituting a group with each other; a game option setting unit which sets, for each of the two or more players, a game option related to a shared mission; a game control unit which advances the game for each of the two or more players based on the set game option; a mission achievement determining unit which determines, based on gameplay data of the two or more players in the group, whether or not the shared mission has been achieved; and a reward determining unit which determines, based on an achievement status of the shared mission and a setting status of the game option, a reward to be associated with the two or more players.

15 Claims, 5 Drawing Sheets

(51) Int. Cl.
*A63F 13/52* (2014.01)
*A63F 13/67* (2014.01)
*A63F 13/847* (2014.01)

(56) References Cited

U.S. PATENT DOCUMENTS

| | | | |
|---|---|---|---|
| 2010/0304839 A1* | 12/2010 | Johnson | A63F 13/67 |
| | | | 463/43 |
| 2013/0225260 A1* | 8/2013 | Cudak | A63F 13/67 |
| | | | 463/23 |
| 2015/0273340 A1* | 10/2015 | Cudak | A63F 13/00 |
| | | | 463/42 |
| 2016/0067615 A1* | 3/2016 | Lai | A63F 13/327 |
| | | | 463/23 |
| 2019/0091577 A1* | 3/2019 | Reiche, III | A63F 13/795 |

FOREIGN PATENT DOCUMENTS

| | | |
|---|---|---|
| JP | 2018-114185 A | 7/2018 |
| JP | 2019-010541 A | 1/2019 |
| JP | 2019-170883 A | 10/2019 |

\* cited by examiner

| TEAM ID | PLAYER ID | DIFFICULTY |
|---|---|---|
| A | a | HIGH |
|  | b | LOW |
|  | c | LOW |
| ... | ... | ... |

GAME SYSTEM FACILITATING MULTIPLE PLAYERS PLAYING TOGETHER WITH DIFFERENT GAME OPTIONS

TECHNICAL FIELD

The present invention relates to a game system, a game server, and a game program.

BACKGROUND ART

Conventionally, among games in which a plurality of players strive to achieve a shared mission, there are games which grant a reward to players upon achieving the mission (for example, PTL 1).

CITATION LIST

Patent Literature

PTL 1: JP-A-2002-239237

SUMMARY OF INVENTION

Technical Problem

In the games described above, since a play style of a game and abilities in the game differ from one player to the next, it is common practice to set several game options (such as difficulties) to the game in advance, have each player specify a game option in accordance with the player's own game style or abilities and make a matching request, and match players having specified a common game option with each other and have the players play the game.

However, there is a problem in that, when the number of players desiring a specific game option is extremely small, a situation arises where it is difficult to establish matching with the game option. In addition, in this case, there is also a problem in that a player may emerge who ends up playing the game based on a game option not consistent with the player's own game style or abilities in an attempt to make matching more readily establishable, in which case it would be difficult for the player to win a reward for mission achievement.

The invention has been made in consideration of problems such as those described above and an object thereof is to provide a game system, a game server, and a game program which enable a player to appropriately win a mission achievement reward and the like.

Solution to Problem (1) The invention relates to a game system which executes a game in which a group of two or more players strives to achieve a shared mission, the game system including: a group organizing unit which associates the two or more players in the group with each other; a game option setting unit which sets, for each of the two or more players, a game option related to the shared mission; a game control unit which advances the game for each of the two or more players based on the set game option; a mission achievement determining unit which determines, based on gameplay data of the two or more players in the group, whether or not the shared mission has been achieved; and a reward determining unit which determines, based on an achievement status of the shared mission and a setting status of the game option, a reward to be associated with the two or more players. In addition, the invention relates to a game server including the units described above. Furthermore, the invention relates to a game program for causing a computer to function as the units described above. Moreover, the invention relates to a computer-readable information storage medium storing the game program described above.

According to the invention, a player can appropriately win a reward in accordance with an achievement status of a shared mission and a setting status of a game option and enjoy gameplay based on a game option in accordance with the player's own game style or abilities.

(2) In the game system, the game server, the game program, and the information storage medium according to the invention, the reward determining unit may determine a shared reward to be associated with the two or more players based on the achievement status of the shared mission, and determine a special reward to be associated with the two or more players based on the setting status of the game option.

According to the invention, a player can not only win a shared reward in accordance with an achievement status of a shared mission but also win a special reward in accordance with a setting status of a game option and enjoy gameplay based on a game option in accordance with the player's own game style or abilities.

(3) In the game system, the game server, the game program, and the information storage medium according to the invention, the reward determining unit may determine the reward based on the setting status of the game option when the shared mission has been achieved.

According to the invention, when a player achieves a shared mission, the player can win a reward in accordance with a setting status of a game option and enjoy gameplay based on a game option in accordance with the player's own game style or abilities.

(4) In the game system, the game server, the game program, and the information storage medium according to the invention, the mission achievement determining unit may determine whether or not the shared mission has been achieved, based on gameplay data of each of the two or more players in the group.

According to the invention, since whether or not a shared mission is achieved is determined based on gameplay data of each of a plurality of players constituting a group, a player can enjoy a game of striving to achieve a shared mission in cooperation with other players who constitute the group.

(5) In the game system, the game server, the game program, and the information storage medium according to the invention, the mission achievement determining unit may determine achievement of the shared mission when gameplay data of each of the two or more players in the group has satisfied a given condition.

According to the invention, since it is determined that a shared mission is achieved when gameplay data of each of a plurality of players constituting a group satisfies a given condition, a player can enjoy a game of striving to achieve a shared mission in cooperation with other players who constitute the group.

(6) In the game system, the game server, the game program, and the information storage medium according to the invention, the group organizing unit may allow players who do not share the set game option to be associated with each other.

According to the invention, since setting a specific game option does not prevent matching from being established, a player can enjoy gameplay based on a game option in accordance with the player's own game style or abilities.

(7) In the game system, the game server, the game program, and the information storage medium according to the invention, the reward determining unit may determine the reward based on the setting status of the game option having been set before the game is executed.

According to the invention, a player can appropriately win a reward in accordance with a game option having been set prior to execution of a game.

(8) In the game system, the game server, the game program, and the information storage medium according to the invention, the reward determining unit may present a player with contents of the reward having been determined before the game is executed.

According to the invention, a player can determine whether or not to make a matching request by confirming contents of a reward which is determined in accordance with a game option having been set.

(9) In the game system, the game server, the game program, and the information storage medium according to the invention, the reward determining unit may determine whether or not to upgrade contents of the reward based on a history of settings of the game option.

According to the invention, a player can appropriately win a reward in accordance with a history of settings of a game option.

(10) In the game system, the game server, the game program, and the information storage medium according to the invention, the reward determining unit may upgrade contents of the reward when a game result of a player is superior to a game result of another player having the set game option which is different from the set game option of the player.

According to the invention, a player can appropriately win a reward in accordance with a setting status of a game option and a game result.

(11) In the game system, the game server, the game program, and the information storage medium according to the invention, the game option setting unit may set information related to difficulty as the game option.

According to the invention, a player can appropriately win a reward in accordance with an achievement status of a shared mission and a setting status of difficulty and enjoy gameplay based on difficulty in accordance with the player's own game style or abilities.

(12) In the game system, the game server, the game program, and the information storage medium according to the invention, the reward determining unit may raise a degree of upgrade on contents of the reward as the set difficulty rises.

According to the invention, a player can appropriately win a reward in accordance with a setting status of difficulty.

(13) In the game system, the game server, the game program, and the information storage medium according to the invention, the reward determining unit may determine the reward based on an attribute and/or the number of the two or more players in the group.

According to the invention, a player can appropriately win a reward in accordance with an attribute and/or the number of players constituting a group.

(14) In the game system, the game server, the game program, and the information storage medium according to the invention, the reward determining unit may determine the reward based on a type of the shared mission.

According to the invention, a player can appropriately win a reward in accordance with a type of a shared mission.

DESCRIPTION OF EMBODIMENTS

Hereinafter, the present embodiment will be described. It is to be understood that the present embodiment to be described below is not intended to unduly limit contents of the invention as set forth in the claims. It is also to be understood that all of the components described in the present embodiment are not necessarily essential requirements of the invention.

1. Configuration

Figure 1:
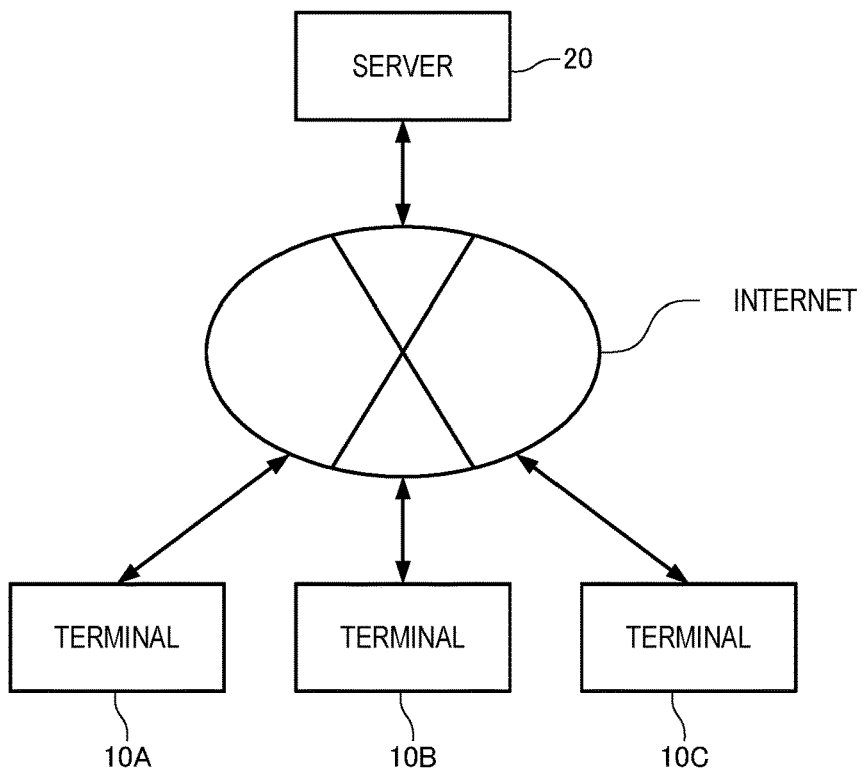
FIG. 1 is a diagram illustrating a game system according to the present embodiment.

FIG. 1 illustrates a game system according to the present embodiment. In the present embodiment, the game system is constituted of a plurality of terminals 10 and a server 20 (a server system). In other words, as illustrated in FIG. 1, in the game system according to the present embodiment, the server 20 (a game server) which provides a service and terminals 10 (10A, 10B, 10C, . . . ) are configured to be connectible to a network.

The server 20 is an information processing apparatus which provides an online game service in response to a request from the terminals 10. The server 20 can be constituted of one or a plurality of servers (authentication servers, matching servers, game processing servers, communication servers, billing servers, database servers, and the like).

In the present embodiment, the terminals 10 execute a game while the server 20 executes processing for matching players with each other, processing for controlling progress of the game being executed by the terminals 10, processing for granting a reward to a player, and the like. In addition, the server 20 manages information such as account information of players, game results of a game executed by the terminals 10, game media (virtual cards representing characters, items, in-game currencies, and the like) which can be used in the game, and the like.

The terminal 10 is an information processing apparatus such as a mobile terminal (a smart phone, a mobile phone, a portable gaming console, or the like), a personal computer (PC), a game apparatus, or an image generation apparatus and is capable of being connected to the server 20 via a network such as the Internet (a WAN) or a LAN. A communication line between the terminal 10 and the server 20 may be either wired or wireless.

Figure 2:
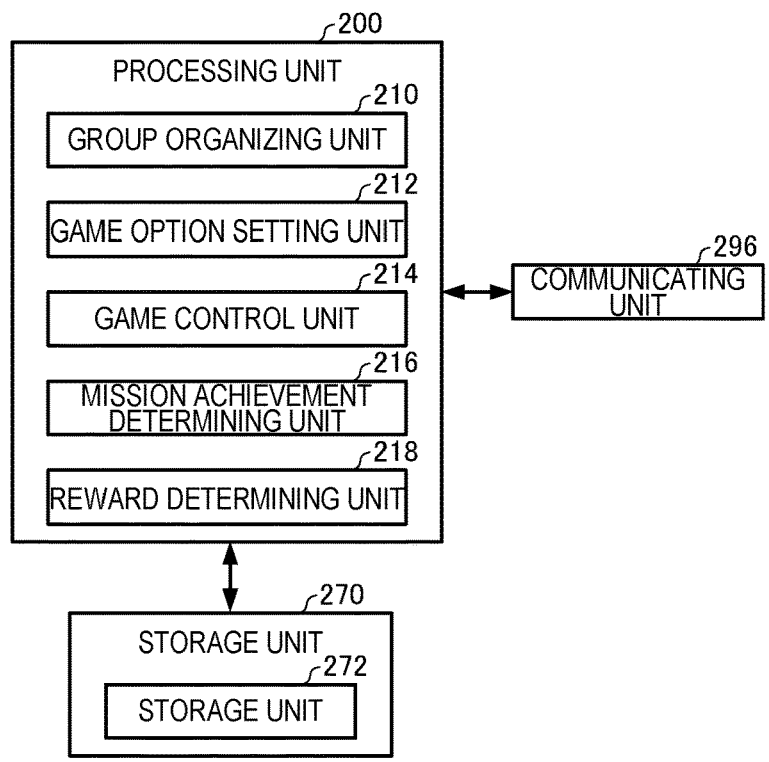
FIG. 2 illustrates an example of a functional block diagram of a server according to the present embodiment.

FIG. 2 illustrates an example of a functional block diagram of the server 20 according to the present embodiment. Alternatively, the server according to the present embodiment may be configured by omitting a part of the components (units) in FIG. 2.

A storage unit 270 stores programs and various kinds of data which enable a computer to function as respective units of a processing unit 200 and functions as a work area of the processing unit 200, and the functions of the storage unit 270 can be realized by a hard disk, a RAM, or the like. The storage unit 270 includes a storage unit 272 (for example, a database).

The storage unit 272 stores player information of each of a plurality of players participating in an online game to be executed by the game system according to the present embodiment. For example, the storage unit 272 stores, as player information, a player name (a player account), a password, address information (such as an IP address) of a terminal 10, and the like in association with player identification information (a player ID, an ID of a terminal used by the player, or the like) of each of the plurality of players. In addition, the storage unit 272 stores, as player information, information for specifying another player having formed a friendship (an example of a predetermined relationship) with a player. Furthermore, the storage unit 272 stores, as player information, information related to game media owned by a player in association with player identification information. Gameplay data (a game status, a game result, and the like) of each player is stored as player information in association with player identification information.

A communicating unit 296 implements various control for communicating with another terminal 10 or another server, and a function of the communicating unit 296 can be realized by hardware such as various processors and a communication ASIC, a program, or the like.

The processing unit 200 (processor) performs various kinds of processing such as processing related to management of player information and login/logout and communication control processing based on data, programs, and the like transmitted from the terminals 10 and received via the communicating unit 296. The processing unit 200 performs various kinds of processing using the storage unit 270 as a work area. Functions of the processing unit 200 can be realized by hardware such as various processors (a CPU, DSP, or the like) and an ASIC (a gate array or the like) or by programs.

The game system according to the present embodiment executes a game in which a plurality of players organize a group and the group strives to achieve a shared mission. The game may be a game in which players in the group cooperate with each other to engage in a shared mission. Hereinafter, a group in which players are in a cooperative relationship will also be referred to as a "team". For example, the game may be a game in which a team matches up against another team (for example, a game in which a shared mission is to defeat an opposing team) or a game in which a team matches up against an NPC (a plurality of NPCs or a single NPC) (for example, a game in which a shared mission is to defeat an opposing NPC). In addition, the game may be a game in which players in a group match up against each other (for example, a game in which a shared mission is to defeat another player in the group). In this case, the game may be a game in which only players match up against each other or a game in which there is an NPC who interferes with a match-up between players or assists a player during a match-up between players. For example, the game according to the present embodiment can be applied to a shooting game (TPS or FPS), an action game, a puzzle game, a racing game, an RPG, or a rhythm game.

The shared mission may be a mission that is shared only by players in the team or a mission that is also shared with a player outside of the team (a player of an opposing team, a player of a team matching up against another team, or another player otherwise playing the game). In addition, the shared mission may be a mission that is achieved when any of the players in the team achieves the mission (for example, defeating an opposing boss or acquiring a specific item) or a mission that can only be achieved through cooperation by a team (for example, every member of the team completes the mission, everyone stays alive, or points that cannot be gained by an individual are gained by an entire team). Furthermore, achievement of missions is not limited to those described above and whether or not a mission is achieved may be determined for each individual player. For example, a mission may be achieved when a predetermined number of opponents is defeated before other players or when a predetermined number of points (such as a score) or more is gained before other players. Examples of the shared mission include defeating a specific opponent (for example, a boss NPC), defeating a predetermined number of opponents (players of an opposing team, NPCs, or other players of a team), staying alive until a time limit expires (for example, a case of a game in which whichever team with a larger number of surviving members wins), defeating all opposing NPCs, defeating all opposing players, acquiring a specific item, reaching a goal before opponents, occupying an opponent's position, defending one's own position, acquiring a predetermined number of points or items, and completing a stage while retaining a given number of allowable failures or a given health point (for example, in the case of a rhythm game, playing the game until the end of a song).

The processing unit 200 includes a group organizing unit 210, a game option setting unit 212, a game control unit 214, a mission achievement determining unit 216, and a reward determining unit 218.

The group organizing unit 210 performs processing for associating (matching) players constituting a group with each other. Information associating players with each other (information specifying each player belonging to a group) is stored in the storage unit 272. The group organizing unit 210 may automatically match players with each other or, upon receiving matching requests from players, match players having made the matching requests with other. In addition, the group organizing unit 210 may receive a solicitation for new members from a player and applications in response to the solicitation for new members and when the player having issued the solicitation for new members approves another player having applied in response to the solicitation for new members, the group organizing unit 210 may match the player and the other player with each other. Furthermore, the matching processing may be performed between terminals 10 connected to each other by near-field radio instead of having the server 20 perform the matching processing.

In addition, the group organizing unit 210 may allow matching of players of which a set game option (to be described later) is not shared (perform matching regardless of a set game option). Furthermore, the group organizing unit 210 may match players with a shared attribute (a level, a gameplay history, a rank, age, gender, or the like which cannot be arbitrarily set by a player) other than a game option or perform matching regardless of such attributes. In addition, a group need only include a plurality of players and may further include one or more NPCs in addition to the plurality of players.

The game option setting unit 212 sets, for each player, a game option related to a shared mission based on an operation by the player. Setting information of a game option of each player is stored in the storage unit 272. It should be noted that "setting a game option based on an operation by a player" may involve setting a game option specified by the operation or automatically (for example, randomly) determining and setting a game option in accordance with the operation. For example, a game option may be randomly determined and set when a player performs an operation to make a matching request or performs a given operation (for example, when operating a button such as a "game option setting button") or a game option may be automatically determined and set in accordance with a setting tendency of a player in the past (for example, setting a game option having been set the largest number of times (or having been set most frequently) in the past) when the player performs a given operation (for example, when operating a button such as a "preferred setting button"). The game option setting unit 212 may set a game option of each player based on an operation by each player before the game is executed. In addition, the game option setting unit 212 may set information (option) related to difficulty of a game as a game option. For example, in accordance with the set difficulty, the number or abilities (offensive capability, defensive capability, stamina level, or the like) of opponents in the game, abilities of a player character, a duration of a time limit, a speed at which blocks fall in a puzzle game, and the number of notes and the manner in which they appear in a rhythm game change. It should be noted that, as a game option, a difficulty itself (high, intermediate, low, or the like) may be set or an option that affects difficulty may be set. For example, as a game option, a character to be used in a game, a type or an attribute (an attribute such as a fire attribute, a job class, or the like) of a character to be used, or an item (such as a weapon) to be used may be set, or the number or abilities of opponents who appear in the game, a time limit, and the like may be set. In addition, as a game option, whether automatic aiming (auto-aim) or manual aiming (manual aim) is to be adopted may be set or a camera angle (whether an angle near an object or an angle far from an object is to be adopted, whether an angle is to be automatically or manually changed, or the like) may be set. Furthermore, as a game option, a game start position or a starting point in a game space (a point where a large number of opponents is present or where a small number of opponents is present or an expugnable or inexpugnable point) may be set. Moreover, as a game option, an assigned part (a role to be played in a game, a job class of a character, or the like) may be set. In addition, when difficulty (difficulty of inflicting damage, ease of sustaining damage) differs from one portion of an opposing boss character to the next, a portion of the boss character (a portion responsible for offense may be set as a game option. Furthermore, a handicap of the game may be set as a game option. Moreover, when games of different types are playable, a type of a game to be played may be set as a game option.

The game control unit 214 implements control for advancing the game for each player based on a game option having been set for each player. The game control unit 214 receives input information from the terminal 10 of a player belonging to a group (team) and transmits the input information to the terminal 10 of other players belonging to the group (in the case of a match-up of team against team, the input information is further transmitted to the terminal 10 of players belonging to the opposing team) and, at the same time, generates information for advancing the game to be executed on the terminal 10 of the player in accordance with a game option (difficulty or the like) having been set in association with the player and transmits the generated information to the terminal 10. In addition, based on game result information or the like transmitted from the terminal 10 of each player having played the game, the game control unit 214 updates gameplay data of each player stored in the storage unit 272.

The mission achievement determining unit 216 determines whether or not a shared mission of a group (team) has been achieved based on gameplay data (defeated opponents, the number of defeated opponents, acquired items, acquired points or the number of acquired items, whether or not the game has been completed or an opponent's position has been occupied, whether or not a goal has been reached or whether or not there are survivors, and the like) of players constituting the group. The mission achievement determining unit 216 may determine whether or not the shared mission is achieved based on gameplay data of each of the plurality of players constituting the group (in other words, a result of the plurality of players cooperating with each other). For example, the mission achievement determining unit 216 may determine that the shared mission is achieved when the gameplay data of each of the plurality of players constituting the group satisfies a given condition (for example, when each of the plurality of players complete the game or stay alive).

The reward determining unit 218 determines a reward to be associated with a player based on an achievement status of a shared mission and a setting status of a game option. A reward (including a shared reward and a special reward to be described later) may take the form of granting a game medium (a character, a card, an item, an in-game currency, or the like) or changing a parameter of a game medium owned by a player (for example, enhancing an ability such as an offensive capability, imparting a new ability (such as a skill), increasing rarity (rareness), strengthening equipment such as a weapon, or changing appearance). In addition, a reward may take the form of changing achievability of a shared mission in a game to be executed next or thereafter (for example, reducing an ability of an opponent to be defeated, reducing the number of opponents to be defeated, reducing points or the number of items to be acquired, adopting a more advantageous method of calculating acquired points or adding a predetermined point to acquired points, making items more readily acquirable, or extending a time limit) or changing achievability of a shared mission in the presently-executed game (assuming that an unachieved shared mission is achieved by reducing the number of opponents to be defeated, by reducing points or the number of items to be acquired, or by adding a predetermined point to acquired points).

Furthermore, the reward determining unit 218 may determine a shared reward to be associated with a player based on an achievement status of a shared mission. In other words, when the shared mission is achieved, a shared reward may be granted to players in the team having achieved the mission. At this point, contents of the shared reward to be granted to each player in the team can be shared among the players (equally granted to each player in the team). Alternatively, contents of the shared reward may be differentiated in accordance with a degree of contribution (for example, the number of defeated opponents, an amount of damage inflicted on an opponent, or the number of acquired items or points) toward achieving the mission of each player in the team, and as the degree of contribution of a player rises, a degree of upgrade on the contents of the shared reward to be granted to the player is raised (for example, granting a game medium with a higher ability or rarity, granting a larger number of game media, increasing a parameter of a game medium owned by the player, or expediting a timing at which the reward is granted). In addition, the shared reward may be granted to players in the team even if the shared mission is not achieved. In this case, when the shared mission is achieved, contents of the shared reward to be granted to the players may be more upgraded as compared to a case where the shared mission is not achieved. Furthermore, when determining whether or not a mission is achieved for each individual player, the shared reward may be granted only to players having achieved the shared mission, or, the shared reward may be granted regardless of whether or not the shared mission is achieved and the contents of the shared reward to be granted to a player having achieved the shared mission are more upgraded than the contents of the shared reward to be granted to a player not having achieved the shared mission.

In addition, the reward determining unit 218 may determine a special reward to be associated with a player based on a setting status of a game option. For example, when difficulty is to be set as a game option, a degree of upgrade on the contents of the special reward to be granted to players may be raised as the set difficulty of a player rises. Furthermore, when setting an option that affects difficulty as a game option, a degree of upgrade on the contents of the special reward to be granted to players may be raised for a player who has set an option which causes difficulty to increase by a greater margin (for example, setting a character with low abilities as a character to be used, setting an opponent with high abilities as an opponent to appear in a game, setting a short period of time as a time limit, setting manual aiming, or setting a point with a lot of opponents or a point that is difficult to attack as game start location).

It should be noted that granting a player a special reward may involve changing (for example, upgrading) contents of a shared reward to be granted to the player. In addition, upgrading contents of a special reward may involve, instead of (or in addition to) upgrading contents of a special reward to be granted to a player, upgrading contents of a shared reward to be granted to the player (including changing not granting the shared reward to granting the shared reward or preventing contents of the shared reward from deteriorating (decreasing)) or upgrading contents of a reward to be granted to another player (for example, another player having formed a friendship with the player).

Furthermore, when a shared mission is achieved, the reward determining unit 218 may determine a special reward to be associated with a player (a player in a team having achieved the mission or a player having achieved the mission) based on a setting status of a game option. In this case, only the special reward may be granted (simply granted as a "reward") instead of granting the shared reward. Even in this case, contents of the "reward" to be granted to players may be upgraded as the set difficulty of a player rises. In addition, the special reward may be granted to players even if the shared mission is not achieved. In this case, when the shared mission is achieved, contents of the special reward to be granted to the players may be upgraded as compared to a case where the shared mission is not achieved. Furthermore, the special reward may be granted to players when the achievement status of the shared mission satisfies a given condition. For example, only the shared reward may be granted to each player in a team when a part of the players in the team (for example, four out of five players) achieve the shared mission and the special reward may be granted in addition to the shared reward to each player in the team when all of the players in the team (for example, five out of five players) achieve the shared mission. In addition, the special reward may be granted after an elapse of a predetermined period of time from the time of achievement of the shared mission. Furthermore, a special reward may be granted upon achieving the shared mission and a special reward may be additionally granted after an elapse of a predetermined period of time from the time of achievement of a mission. The special reward to be additionally granted may be granted when a rate of achievement of the mission (or another mission) after achieving the shared mission is low. Moreover, when there is another player for which a same game option as a player having achieved the shared mission is set, a special reward set in accordance with the game option may be granted in a distributed manner to a plurality of players having set the game option.

In addition, the reward determining unit 218 may upgrade contents of a special reward that is associated with a player when a game result of the player is superior. For example, contents of a special reward that is associated with a player may be upgraded when the player performs gameplay with high difficulty in a game (for example, attacking (for example, with a head shot) a specific portion of an opponent in a shooting game and defeating the opponent) or when the player covers for another player's mistake in a game. Furthermore, contents of a special reward to be granted to a player may be upgraded when the player performs gameplay for assisting a player who does not belong to a team to be next playing a game with the same mission (for example, burying an item so that the item can be retrieved later) or a special reward may be additionally granted to the player after a predetermined period of time elapses from achieving a mission (or when another player receives the assistance). Moreover, a special reward to be granted to a player may be upgraded when a game result of the player is superior to a game result of another player having set higher difficulty than the player.

Furthermore, the reward determining unit 218 may determine whether or not to upgrade contents of a special reward to be associated with a player based on a setting status of a game option of the player. For example, contents of a special reward to be granted to a player may be upgraded when the number of times a game option set by the player has been set in the past is equal to or lower than a predetermined value (for example, when the game option is set for the first time). In this case, even when difficulty set as the game option is low or when a game result of the player is not superior, the contents of the special reward may be upgraded when the game option is set for the first time. In addition, contents of a special reward to be granted to a player may be upgraded when the player is consecutively winning a game (on a winning streak) in a state where a same game option is set.

In addition, the reward determining unit 218 may determine a reward (a special reward or a "reward" in the event that a shared reward is not granted) to be associated with a player based on a setting status of a game option of the player having been set before a game is executed. In this case, the reward determining unit 218 may present the player (display on a display unit of the terminal 10 of the player) with contents of the determined reward before the game is executed. In addition, when contents of a special reward is to be upgraded when a given condition is satisfied (for example, when a shared mission is achieved), the player may be presented with information to that effect before the game is executed.

Furthermore, the reward determining unit 218 may determine a reward (shared reward and/or special reward) to be associated with a player based on information related to a shared mission (information that cannot be individually set by the player). For example, a reward to be granted to a player belonging to a group (team) aiming to achieve a shared mission may be determined in accordance with the number of players belonging to the group, and as the number of players decreases (or as the proportion of actually participating players against a predetermined maximum number of players decreases). In addition, when a group does not include an NPC, contents of a reward to be granted to a player belonging to the group may be more upgraded than a case where the group includes an NPC. Furthermore, a reward to be granted to a player belonging to a group may be determined in accordance with an attribute (a level, gameplay history, a rank, age, gender, or the like) of players belonging to the group. Moreover, a reward to be granted to a player belonging to a group may be determined in accordance with the number of players for each attribute of players belonging to the group. For example, contents of a reward to be granted to a player belonging to a group may be upgraded as the number of high-level players and the number of players with a long gameplay history increases, among players belonging to the group. In addition, a reward to be granted to a player aiming to achieve a shared mission may be determined in accordance with a type of the shared mission (a type of a game itself related to the shared mission, a length of play time of the game, whether or not a specific object is arranged in the game, or the like). Furthermore, when selecting a single mission from a plurality of missions and playing the selected mission, a reward may be determined in accordance with the number of times the mission is selected, and contents of a reward to be granted to a player having played a game of the mission may be upgraded as the number of times the mission is selected increases and the popularity of the mission rises (or as the number of times the mission is selected decreases and the popularity of the mission falls).

Figure 3:
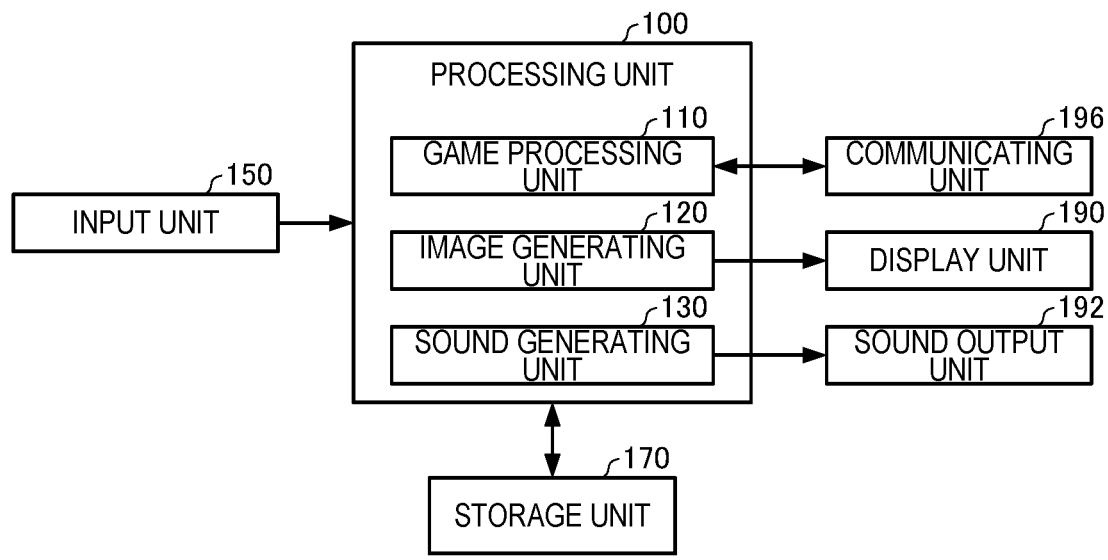
FIG. 3 illustrates an example of a functional block diagram of a terminal according to the present embodiment.

FIG. 3 illustrates an example of a functional block diagram of the terminal 10 according to the present embodiment. Alternatively, a game apparatus according to the present embodiment may be configured by omitting a part of the components (units) in FIG. 3.

An input unit 150 is a device which enables a player to input (detect) input information and which outputs input information (operation input) of the player to the processing unit 100. Functions of the input unit 150 can be realized by an input device such as a touch panel, a touch pad, a mouse, directional keys or buttons, or a keyboard.

A storage unit 170 stores programs and various kinds of data which enable a computer to function as respective units of a processing unit 100 and functions as a work area of the processing unit 100, and the functions of the storage unit 170 can be realized by a hard disk, a RAM, or the like.

A display unit 190 outputs a game image generated by the processing unit 100, and functions of the display unit 190 can be realized by a display such as a touch panel, an LCD, or an HMD (head-mounted display) which also functions as the input unit 150.

A sound output unit 192 is for outputting sound generated by the processing unit 100 and a function thereof can be realized by a speaker, a headphone, or the like.

A communicating unit 196 implements various control for communicating with the server 20 or another terminal 10, and a function of the communicating unit 196 can be realized by hardware such as various processors and a communication ASIC, a program, or the like.

It should be noted that the terminal 10 may receive a program or various kinds of data which is stored in an information storage medium or a storage unit included in the server 20 and which causes a computer to function as each unit of the processing unit 100 via a network and may store the received program or data in the storage unit 170. Cases where the terminal functions by receiving a program and various kinds of data in this manner are also included in the scope of the invention.

The processing unit 100 (processor) performs processing such as game processing, image generation processing, and sound generation processing based on input information (operation information) or a program from the input unit 150, data received via the communicating unit 196, and the like. Functions of the processing unit 100 can be realized by hardware such as various processors (a CPU, DSP, or the like) and an ASIC (a gate array or the like) or by programs. When an operation is performed by a player for instructing a matching request or setting a game option, the processing unit 100 transmits instruction information to that effect to the server 20 and transmits input information and the like of players executing a game to the server 20. The processing unit 100 includes a game processing unit 110, an image generating unit 120, and a sound generating unit 130.

The game processing unit 110 performs processing for executing a game in which a group constituted by a player and other players strive to achieve a shared mission based on input information from the input unit 150 and information received from the server 20 (information for advancing a game in accordance with a set game option, input information of the other players, or the like).

The image generating unit 120 performs image drawing processing based on results of various kinds of processing performed by the processing unit 100 and, accordingly, generates a game image and outputs the game image to the display unit 190. The image generating unit 120 may generate an image (a so-called three dimensional image) viewed from a virtual camera (a given viewpoint) in an object space (a game space).

The sound generating unit 130 performs sound processing based on results of various kinds of processing performed by the processing unit 100, generates game sounds including a BGM, a sound effect, and voices, and outputs the game sounds to the sound output unit 192.

In addition, when starting a game, the processing unit 100 transmits information for notifying that the game has started to the server 20, and when the game ends, the processing unit 100 transmits game result information related to a game result and various kinds of game parameters (information related to game media owned by players, a game progress status, and the like) to the server 20. The server 20 performs update processing of various kinds of data associated with each player based on the game result information transmitted from the game apparatus (the terminal 10). Moreover, in addition to an example of transmitting game result information generated by the terminal 10 to the server 20, game result information may be generated by the server 20 based on various kinds of information sequentially transmitted from the terminal 10 to the server 20 while a game is being executed. In addition, whether or not a game has ended may be determined by the terminal 10 or by the server 20.

Furthermore, the game system according to the present embodiment may be configured as a server system. The server system may be constituted of one or a plurality of servers (authentication servers, game processing servers, communication servers, billing servers, database servers, and the like). In this case, the server system performs processing of the game processing unit 110 based on operation input (data input to the input unit of a terminal) transmitted from one or a plurality of terminals (for example, smart phones, mobile phones, portable gaming consoles, or the like) connected via a network, generates image generation data for generating an image, and transmits the generated image generation data to each terminal. In this case, image generation data refers to data for displaying an image generated using a method according to the present embodiment on each terminal and may be image data itself or various kinds of data (object data, game processing result data, or the like) to be used by each terminal to generate an image. A configuration may be adopted in which all of the processing by the group organizing unit 210, the game option setting unit 212, the game control unit 214, the mission achievement determining unit 216, the reward determining unit 218, and the game processing unit 110 is executed by a server, executed by terminals, or executed in a distributed manner by a server and terminals. The invention can be applied to a game application to be executed on a smart phone, game software for a home gaming console, game software for a PC, a browser game for a smart phone or a PC, a business-use gaming console, and the like.

2. Method According to Present Embodiment

Next, a method according to the present embodiment will be described with reference to the drawings.

The game system according to the present embodiment executes a game in which a plurality of players organize a team and the players in the team cooperate with each other and strive to achieve a shared mission. An example of a game in which a team matches up against an NPC and a shared mission of game is to defeat the opposing NPC will now be described.

Figure 4:
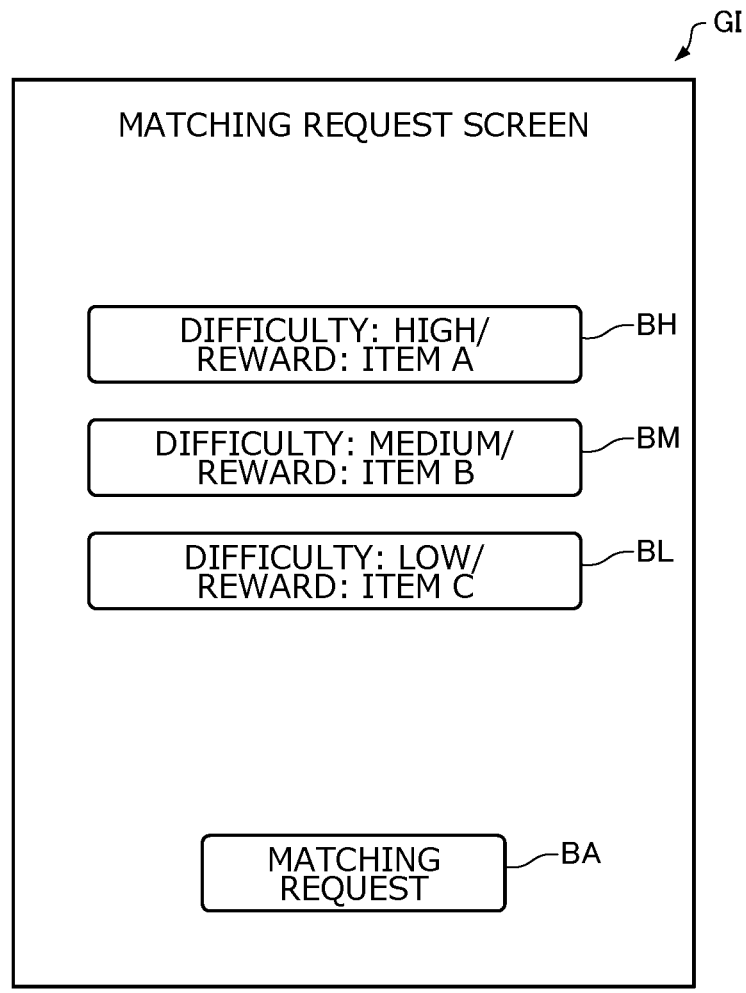
FIG. 4 is a diagram illustrating a game screen which is displayed on a display unit of a terminal of a player when making a matching request.

FIG. 4 is a diagram illustrating a game screen GI which is displayed on the display unit 190 (touch panel) of the terminal 10 of a player when making a matching request. The game screen GI illustrated in FIG. 4 displays three setting buttons BH, BM, and BL for setting difficulty (an example of a game option) and a request button BA for executing a request for matching. The setting button BH is for setting difficulty "high", the setting button BM is for setting difficulty "medium", and the setting button BL is for setting difficulty "low". The three setting buttons BH, BM, and BL respectively display contents of a reward (a special reward) to be granted to a player when the shared mission is achieved. In this example, an item "A" is determined as the special reward corresponding to the difficulty "high", an item "B" with a lower value (ability, rareness, or the like) than the item "A" is determined as the special reward corresponding to the difficulty "medium", and an item "C" with a lower value than the item "B" is determined as the special reward corresponding to the difficulty "low". In other words, a player can win the item "A" as a special reward when defeating the opponent while setting the difficulty "high", win the item "B" as a special reward when defeating the opponent while setting the difficulty "medium", and win the item "C" as a special reward when defeating the opponent while setting the difficulty "low". In this case, by presenting, upon making a matching request, a player with contents of a special reward having been determined in accordance with difficulty, the player is enabled to make a matching request after checking contents of the special reward. Alternatively, by presenting, after making a matching request, a player with contents of a special reward having been determined in accordance with difficulty set by the player, the player may be enabled to cancel a matching request after checking contents of the special reward.

When a player operates (selects) any of the three setting buttons BH, BM, and BL and then operates the request button BA, a matching request including information on the selected difficulty is received by the server 20 and the server 20 matches (associates) the player and another player having made a matching request with each other.

Figures 5, 6:
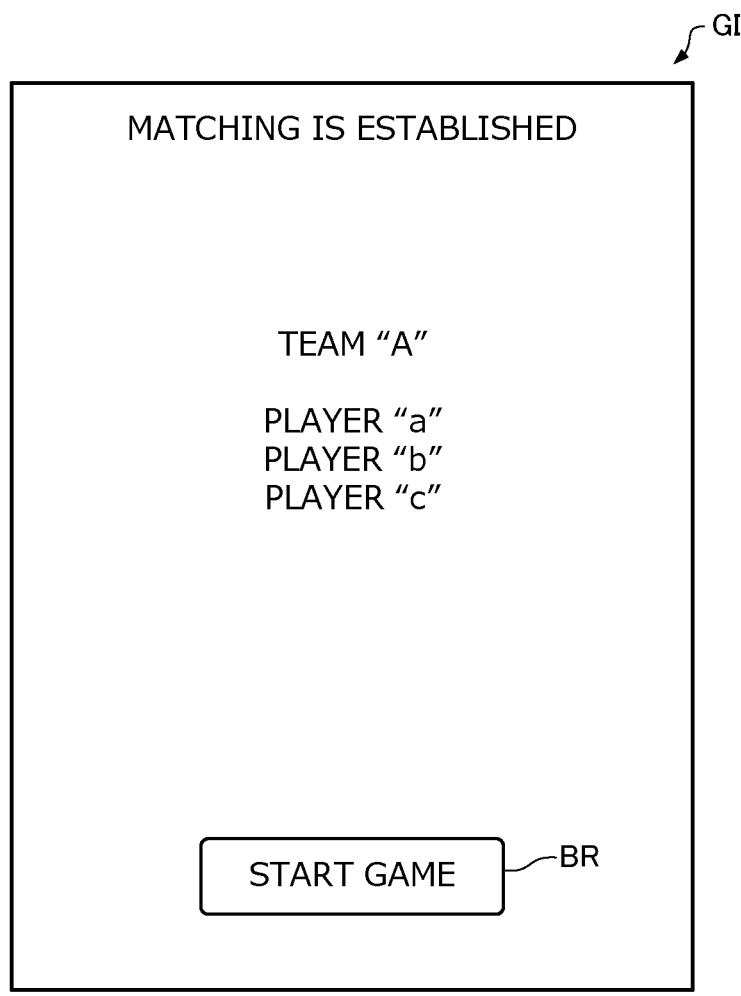
FIG. 5 illustrates an example of a table storing information of teams constituted of a plurality of matched players.
FIG. 6 is a diagram illustrating a game screen which is displayed on a display unit of a terminal of each matched player.

FIG. 5 illustrates an example of a table storing information of teams constituted of a plurality of matched players. The table is stored in the storage unit 272. A table 300 stores, in association with a team ID 310 of a team, a player ID 320 of each player belonging to the team and difficulty 330 (a setting status of a game option) set by each player. In this example, a team "A" is constituted of three players "a", "b", and "c", the player "a" has set difficulty "high" and the players "b" and "c" have set difficulty "low". In this manner, the present embodiment allows matching between players having set different difficulties.

Once matching is established, as illustrated in FIG. 6, a game screen GI showing that matching has been established is displayed on the display unit 190 of the terminal 10 of each matched player. In this case, the game screen GI indicating a player name of each player constituting the team "A" is displayed on the display unit 190 of the terminal 10 of each of the three players "a", "b", and "c" constituting the team "A". The game screen in FIG. 6 displays an execution button BR for starting execution of a game. When each matched player operates the execution button BR, a game in which the team "A" and an opponent NPC match up against each other is executed on the terminal 10 of each player.

Figure 7:
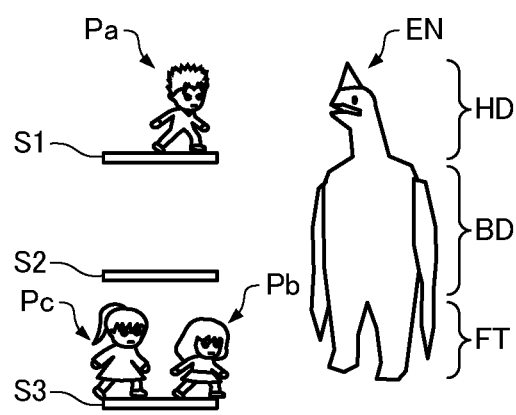
FIG. 7 is a diagram illustrating a character of each player in a team and an opposing character having been arranged in a game space.

FIG. 7 is a diagram illustrating a character of each player in a team and an opposing character having been arranged in a game space. An opposing character EN being an opposing NPC and characters of the respective players in the team (a character Pa of the player "a" in the team "A", a character Pb of the player "b" in the team "A", and a character Pc of the player "c" in the team "A") are arranged in the game space. The opposing character EN is constituted of three portions, namely, a head portion HD (an upper-level portion), a body portion BD (a middle-level portion), and a leg portion FT (a lower-level portion), and a portion which the character of each player is responsible for attacking is determined in accordance with the difficulty set by the player. The higher the difficulty set by a player, the stronger the portion for which the character of the player is responsible. Specifically, the character of a player having set difficulty "high" is responsible for the head portion HD having a highest offensive capability and a highest defensive capability, the character of a player having set difficulty "medium" is responsible for the body portion BD having a next highest offensive capability and a next highest defensive capability, and the character of a player having set difficulty "low" is responsible for the leg portion FT having a lowest offensive capability and a lowest defensive capability. In this case, among the characters of the players in the team "A", the character Pa of the player "a" having set difficulty "high" is arranged on an uppermost level of a scaffold S1 and is responsible for the head portion HD and characters Pb and Pc of the players "b" and "c" having set difficulty "low" are arranged on a lowermost level of a scaffold S3 and are responsible for the leg portion FT. Moreover, when there is a player having set difficulty "medium" in the team, the character of the player is arranged on a middle level of a scaffold S2 and is responsible for the body portion BD.

Once the game starts, the characters Pa, Pb, and Pc of the respective players in the team attack the opposing character EN (portions for which the respective characters are responsible) based on operations by the players, a stamina level of the opposing character EN decreases in accordance with an offensive capability of the character Pa having attacked the head portion HD and a defensive capability of the head portion HD, the stamina level of the opposing character EN decreases in accordance with an offensive capability of the character Pb having attacked the leg portion FT and a defensive capability of the leg portion FT, and the stamina level of the opposing character EN decreases in accordance with an offensive capability of the character Pc having attacked the leg portion FT and the defensive capability of the leg portion FT. Each portion of the opposing character EN is destroyed once a certain level of damage or more is sustained. In addition, when the body portion BD or the leg portion FT of the opposing character EN is destroyed before the head portion HD, the offensive capability and the defensive capability of the head portion HD decline, and when the leg portion FT is destroyed before the body portion BD, the offensive capability and the defensive capability of the body portion BD decline. In other words, by destroying a lower-level portion of the opposing character EN before destroying an upper-level portion thereof, the match-up with the opposing character EN can be caused to proceed advantageously. Furthermore, the opposing character EN attacks the characters Pa, Pb, and Pc according to a given algorithm, a stamina level of the character Pa decreases in accordance with an offensive capability of the opposing character EN (the head portion HD) having attacked the character Pa and a defensive capability of the character Pa, a stamina level of the character Pb decreases in accordance with an offensive capability of the opposing character EN (the leg portion FT) having attacked the character Pb and a defensive capability of the character Pb, and a stamina level of the character Pc decreases in accordance with the offensive capability of the opposing character EN (the leg portion FT) having attacked the character Pc and a defensive capability of the character Pc. In addition, when the stamina level of the opposing character EN decreases to or below a predetermined value (when a sum of amounts of damage inflicted on the opposing character EN by the characters Pa, Pb, and Pc equals or exceeds a predetermined value) or when all of the portions of the opposing character EN are destroyed before stamina levels of the characters Pa, Pb, and Pc decrease to or below the predetermined value (for example, 0) (or before the limited time is up), the opposing character EN is destroyed and the shared mission of the team "A" of defeating the opposing character EN is achieved.

When the shared mission of the team "A" is achieved, a shared reward is granted to the respective players "a", "b", and "c" in the team "A". At this point, a reward with same contents may be granted as the shared reward to each player in the team or rewards with different contents may be granted as the shared reward in accordance with a contribution of each player to achieving the mission. For example, contents of the shared reward to be granted to the players may be upgraded as an amount of damage inflicted to the opposing character EN by the character of a player increases (for example, granting a game medium with a higher value or granting a larger number of game media).

In addition, when the shared mission of the team "A" is achieved, a special reward determined based on set difficulty is granted to the respective players "a", "b", and "c" in the team "A". In other words, as presented by the game screen GI illustrated in FIG. 4, the item "A" is granted as the special reward to the player "a" having set difficulty "high" and the item "C" is granted as the special reward to the players "b" and "c" having set difficulty "low". Furthermore, a special reward to be granted to a player may be upgraded when a game result of the player is superior to a game result of another player having set higher difficulty than the player. For example, when the character Pc of the player "C" of which difficulty is "low" destroys the leg portion FT before the character Pa of the player "A" of which difficulty is "high" destroys the head portion HD, since an effect of lowering the offensive capability and the defensive capability of the head portion HD is created, a game result of the player "C" may be determined to be a superior game result and an item with a higher value than the item "C" (the item "B" or the item "A", or an item with an even higher value than the items "B" and "A") may be granted to the player "C" as a special reward.

According to the present embodiment, since matching between players having set different difficulties are allowed and a player can win a special reward in accordance with a set difficulty in addition to winning a shared reward when a team achieves a shared mission, the player can enjoy game-play at difficulty in accordance with the player's own game style or abilities. In addition, by upgrading contents of the special reward in accordance with a game result of a player, the player can appropriately win a reward in accordance with a setting status of difficulty and a game result. Furthermore, since contents of a special reward having been determined in accordance with a setting status of difficulty is presented to a player before a game is started, the player can make a matching request after checking the contents of the special reward.

3. Processing

Figure 8:
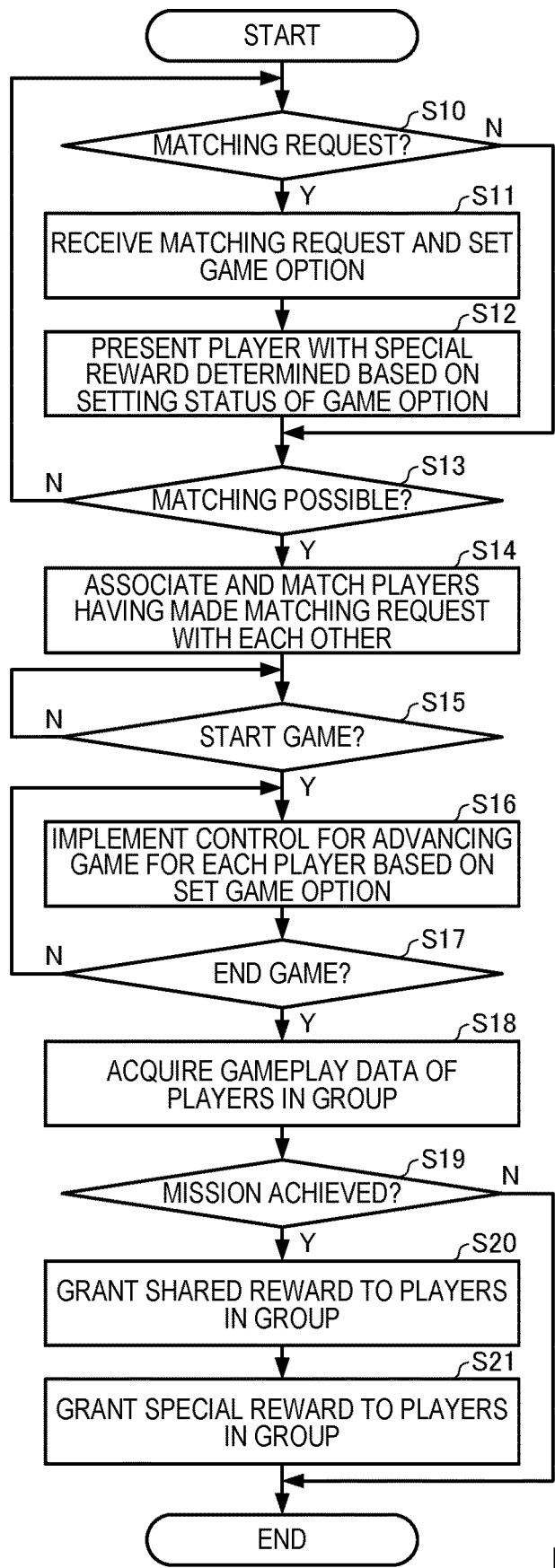
FIG. 8 is a flow chart illustrating a flow of processing of the game system according to the present embodiment.

Next, an example of processing by the game system (the server 20) according to the present embodiment will be described with reference to the flow chart illustrated in FIG. 8.

First, the group organizing unit 210 determines whether or not a request for matching has been received from the terminal 10 of a player (step S10), and when a request for matching has been received (Y in step S10), a matching request by the player is received and the game option setting unit 212 sets, in association with the player, a game option specified by the player upon making the matching request (step S11). Next, the reward determining unit 218 determines a special reward to be granted to the player based on a setting status of the game option of the player and presents the player with contents of the determined special reward (step S12). In other words, information for causing contents of the determined special reward to be displayed on the display unit 190 of the terminal 10 of the player is transmitted to the terminal 10. Next, the group organizing unit 210 determines whether or not matching is possible (whether or not the number of players having made a matching request but for which matching has not been established has reached a predetermined number) (step S13), and when matching is not possible (N in step S13), the group organizing unit 210 makes a transition to step S10. When matching is possible (Y in step S13), the group organizing unit 210 associates and matches players having made a matching request with each other and registers, in association with an ID of a group (a team ID), a player ID of each matched player and a game option set for each player in the table 300 (step S14).

Next, the game control unit 214 determines whether or not information instructing a start of a game has been received from the terminal 10 of each matched player (in the group) (step S15), and when the information has been received (Y in step S15), the game control unit 214 implements control for advancing the game for each player in the group based on the game option having been set for the player (step S16). In other words, information for advancing, in accordance with a game option set for each player, a game to be executed on the terminal 10 of each player is generated and transmitted to the terminal 10 of the player. Next, the game control unit 214 determines whether or not a notification of an end of the game has been received from the terminal 10 of a player in the group (step S17), and when the notification has been received (Y in step S17), the game control unit 214 updates gameplay data of each player in the group based on game result information or the like having been transmitted from the terminal 10 of each player (step S18).

Next, the mission achievement determining unit 216 determines whether or not a mission that is shared by the group is achieved based on acquired gameplay data (step S19). When the mission is achieved (step S20), the reward determining unit 218 grants a shared reward to each player in the group (step S21) and grants a special reward determined in step S12 (determined based on a setting status of a game option of each player) to each player in the group (step S22).

The invention is not limited to the embodiment described above and various modifications can be made thereto. For example, any term cited with another term having a broader meaning than or the same meaning as the term at least once in the description or the drawings can be replaced by the other term in any place in the description or the drawings.

REFERENCE SIGNS LIST

10 Terminal
20 Server
100 Processing unit
110 Game processing unit
120 Image generating unit
130 Sound generating unit
150 Input unit
170 Storage unit
190 Display unit
192 Sound output unit
196 Communicating unit
200 Processing unit
210 Group organizing unit
212 Game option setting unit
214 Game control unit
216 Mission achievement determining unit
218 Reward determining unit
270 Storage unit
272 Storage unit
296 Communicating unit

The invention claimed is:

1. A game system which executes a game in which a group of two or more players strives to achieve a shared mission, the game system comprising at least one processor configured to function as:
   a group organizing unit which associates the two or more players in the group with each other;
   a game option setting unit which sets, for each of the two or more players, a game option related to the shared mission;
   a game control unit which advances the game for each of the two or more players based on the set game option;
   a mission achievement determining unit which determines, based on gameplay data of the two or more players in the group, whether or not the shared mission has been achieved; and
   a reward determining unit which determines, based on an achievement status of the shared mission and a setting status of the game option, a reward to be associated with the two or more players,
   wherein the group organizing unit allows players who have made different selections for the set game option to be associated with each other in the group, and the game control unit modifies the game for each of the two or more players based on the different selections corresponding to each player.

2. The game system according to claim 1, wherein the reward determining unit determines a shared reward to be associated with the two or more players based on the achievement status of the shared mission, and determines a special reward to be associated with the two or more players based on the setting status of the game option.

3. The game system according to claim 1, wherein the reward determining unit determines the reward based on the setting status of the game option when the shared mission has been achieved.

4. The game system according to claim 1, wherein the mission achievement determining unit determines whether or not the shared mission has been achieved, based on gameplay data of each of the two or more players in the group.

5. The game system according to claim 1, wherein the mission achievement determining unit determines achievement of the shared mission when gameplay data of each of the two or more players in the group has satisfied a given condition.

6. The game system according to claim 1, wherein the reward determining unit determines the reward based on the setting status of the game option having been set before the game is executed.

7. The game system according to claim 1, wherein the reward determining unit presents a player with contents of the reward having been determined before the game is executed.

8. The game system according to claim 1, wherein the reward determining unit determines whether or not to upgrade contents of the reward based on a history of settings of the game option.

9. The game system according to claim 1, wherein the reward determining unit upgrades contents of the reward when a game result of a player is superior to a game result of another player having the set game option which is different from the set game option of the player.

10. The game system according to claim 1, wherein the game option setting unit sets information related to difficulty as the game option.

11. The game system according to claim 10, wherein the reward determining unit raises a degree of upgrade on contents of the reward as the set difficulty rises.

12. The game system according to claim 1, wherein the reward determining unit determines the reward based on an attribute and/or the number of the two or more players in the group.

13. The game system according to claim 1, wherein the reward determining unit determines the reward based on a type of the shared mission.

14. A game server which executes a game in which a group of two or more players strives to achieve a shared mission, the game server comprising:
   a group organizing unit which associates the two or more players in the group with each other;
   a game option setting unit which sets, for each of the two or more players, a game option related to the shared mission;

a game control unit which advances the game for each of the two or more players based on the set game option;

a mission achievement determining unit which determines, based on gameplay data of the two or more players in the group, whether or not the shared mission has been achieved; and a reward determining unit which determines, based on an achievement status of the shared mission and a setting status of the game option, a reward to be associated with the two or more players, wherein the group organizing unit allows players who have made different selections for the set game option to be associated with each other in the group, and the game control unit modifies the game for each of the two or more players based on the different selections corresponding to each player.

15. A non-transitory computer-readable information storage medium storing a game program for executing a game in which a group of two or more players strives to achieve a shared mission, the game program causing a computer to function as:

a group organizing unit which associates the two or more players in the group with each other;

a game option setting unit which sets, for each of the two or more players, a game option related to the shared mission;

a game control unit which advances the game for each of the two or more players based on the set game option;

a mission achievement determining unit which determines, based on gameplay data of the two or more players in the group, whether or not the shared mission has been achieved; and a reward determining unit which determines, based on an achievement status of the shared mission and a setting status of the game option, a reward to be associated with the two or more players, wherein the group organizing unit allows players who have made different selections for the set game option to be associated with each other in the group, and the game control unit modifies the game for each of the two or more players based on the different selections corresponding to each player.

* * * * *